United States Patent [19]
Hewko

[11] 4,006,643
[45] Feb. 8, 1977

[54] SPEEDOMETER DRIVE ARRANGEMENT

[75] Inventor: Lubomyr O. Hewko, Port Clinton, Ohio

[73] Assignee: General Motors Corporation, Detroit, Mich.

[22] Filed: Aug. 15, 1975

[21] Appl. No.: 604,916

[52] U.S. Cl. .................................. 74/12; 74/197
[51] Int. Cl.² .................. F16H 13/06; F16H 13/10; F16H 15/10; F16H 37/02
[58] Field of Search ............. 74/12, 197, 198, 798, 74/194, 209

[56] References Cited
UNITED STATES PATENTS

| | | | |
|---|---|---|---|
| 864,379 | 8/1907 | Junghans | 74/197 |
| 1,177,468 | 3/1916 | Allen | 74/197 |
| 1,631,394 | 6/1927 | Baird et al. | 74/197 |
| 3,727,473 | 4/1973 | Bayer | 74/198 |
| 3,892,134 | 7/1975 | Hewko | 74/12 |
| 3,892,135 | 11/1975 | Hewko | 74/198 X |
| 3,896,676 | 7/1975 | Walters | 74/12 |

*Primary Examiner*—Benjamin W. Wyche
*Assistant Examiner*—A. Russell Burke
*Attorney, Agent, or Firm*—John P. Moran

[57] ABSTRACT

A continuously variable speedometer drive arrangement including a traction drive arrangement operatively connected between the governor drive shaft driven from the transmission output shaft and a speedometer take-off shaft, wherein the radius from the governor drive shaft axis to the center of the traction drive unit may be readily changed by a simple rotary adjustment made through the speedometer take-off shaft.

3 Claims, 1 Drawing Figure

U.S. Patent
Feb. 8, 1977
4,006,643
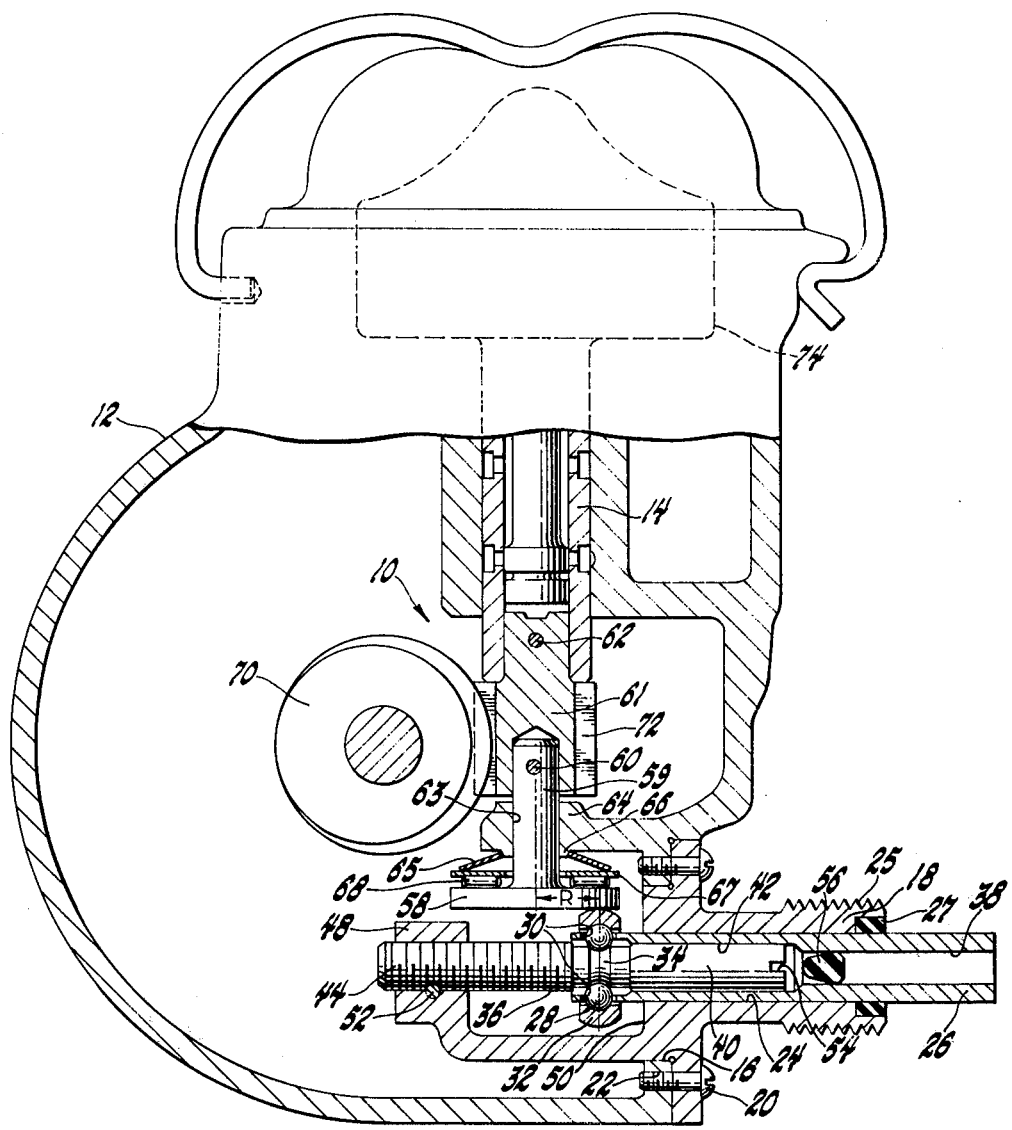

SPEEDOMETER DRIVE ARRANGEMENT

This invention relates generally to automotive speedometer drive arrangements and, more particularly, to a continuously variable drive means therefor.

Generally, automotive speedometers are driven from the transmission output shaft by a pair of crossed-axis gears and a flexible cable. Because a pair of gears has only one finite drive ratio, it is necessary to use different gears for each of countless combinations of tire sizes and axle ratios, with the attendant production and service difficulties of having to maintain a large gear inventory. Additionally, because of normal tire wear and dimensional tolerances of tire diameters, the resultant speed indicated by a conventional speedometer, can be in error.

Currently, drive ratio adjustment is not generally available, and yet speedometer accuracy requirements are becoming increasingly more stringent and, hence, extremely difficult to maintain over the life-time of an automobile. Continuously variable speedometer drive arrangements have been advocated wherein a planetary unit is utilized between a traction drive-ball driven directly by the transmission output shaft and the speedometer take-off shaft, for example, copending applications, of United States Patents to Hewko U.S. Pat. Nos. 3,892,134 and 3,892,135 issued concurrently on July 1, 1975.

Accordingly, a general object of the invention is to provide an improved speedometer drive arrangement wherein initial and periodic adjustment of the governor drive shaft to speedometer take-off shaft speed ratio is readily and accurately accomplished.

Another object of the invention is to provide an infinitely or continuously variable speedometer drive arrangement which is frictionally driven by the governor drive shaft and permits adjustment of the speed ratio between the governor drive shaft and the speedometer power take-off shaft, particularly during final test of the automobile on a roll dynamometer, for example, at the end of an assembly line. Thus, the speed ratio would be adjusted for the exact axle ratio and tire size as installed in the specific vehicle. The accuracy of speed indication thus established could be maintained during the life of the automobile through periodic adjustments of the inventive continuously variable drive arrangement.

A further object of the invention is to provide a continuously variable traction-drive arrangement operatively connected to the governor drive shaft for driving a speedometer take-off shaft, wherein the speed ratio of the governor drive shaft and speedometer take-off shaft may be varied by a simple screw-threading operation.

Still another object of the invention is to provide a speedometer take-off housing rotatably mounted on a transmission governor housing mounted in a traction-drive or frictional-drive relationship between the governor drive shaft and a planetary arrangement operatively connected to the speedometer take-off shaft, the resultant speed ratio being variable by manually adjusting the sun member of the planetary arrangement, access thereto being through the speedometer take-off shaft, to thereby vary the distance or radius between the axis of the governor drive shaft and the center of the radial type planetary drive unit, as required for an accurate reading on the speedometer for various tire size and axle ratio combinations.

These and other objects and advantages of the invention will be apparent when reference is made to the following description and accompanying drawings, wherein:

The FIGURE is a side elevational view in partial cross-section of an automotive transmission case embodying the invention.

Referring now to the drawings in greater detail, the FIGURE illustrates an accessory transmission 10, such as a vehicular speedometer drive arrangement, adapted to being mounted in a vehicular transmission governor housing or case 12 for use with a sleeve-type governor drive shaft 14.

The transmission governor housing 12 includes a side opening 16 formed therein. A connector member 18 is retained against the transmission governor housing 12 by any suitable means, such as screws 20 threadedly mounted in threaded openings 22 formed in the housing 12. An opening 24 is formed through the connector member 18, and threads 25 are formed on the outer peripheral end thereof.

A hollow speedometer take-off shaft 26 is rotatably mounted through the opening 24 including a seal 27, and is rotatably supported at its inner end by virtue of a plurality of equally spaced balls 28 mounted in peripheral cage-like openings 30 formed adjacent the inner end thereof, the balls 28 being confined radially between an outer race 32 and an annular groove or inner race 34 formed at an intermediate point along a rod member 36. Suitable fitting means such as a square or hexagonal opening 38, is formed in the exposed end of the take-off shaft 26 for the connection therewith of a conventional speedometer cable [not shown], the latter being retained in place by a female fitting [not shown] threadedly connected to the external threads 25 of the connector member 18.

The rod member 36 has one end 40 thereof mounted within an enlarged opening 42 formed in the end of the speedometer take-off shaft 26, and the other end 44 thereof threadedly mounted in a fixed abutment 48 extending from an inner surface 50 of the threaded connector member 18. A thread locking device 52 may be operatively connected between the respective threads of the end 44 and the fixed abutment 48. A slot 54 is formed across the end face of the end 40 of the rod member 36, access thereto for adjustment purpose being through the square or hexagonal opening 38 of the speedometer take-off shaft 26. A suitable plug or seal 56 may be inserted in the opening 38 after the initial desired adjustment is made to prevent oil leakage therepast.

A flange 58 of a predetermined diameter is formed on the end of a connector shaft 59 secured by a pin 60 to the governor gear 61 which, in turn, is secured by a pin 62 to the governor drive shaft 14. The connector shaft 59 is rotatably mounted through an opening 63 formed in an abutment 64 formed on an inner surface of the housing 12. A preloaded Belleville type spring member 65 is secured to a shoulder 66 formed on the abutment 64 and confined between the abutment 64 and a disc 67 mounted around the shaft 59. A plurality of needle bearings 68 are mounted between the disc 67 and the flange 58, the latter being urged by the spring member 65, through the disc 67 and the needle bearings 68 into a traction drive relationship with the outer race 32. Thus it may be realized that the outer race 32, the balls 28, the cage-like openings 30 formed in the end of the speedometer take-off shaft 26, and the annular groove or inner race 34 formed in the rod member 36 serve as a ring, planets, carrier, and reaction sun, respectively, of a planetary ball traction drive unit which provides a predetermined speed reduction, say, 1.7:1, between the input at the ring 32 and the output at the carrier 30 and the latter's associated speedometer take-off shaft 26.

In the usual manner, a governor drive gear 70, operatively driven by the transmission output shaft [not shown], meshes with teeth 72 formed on the governor gear member 61 secured by the connector pin 62 to the governor drive shaft 14 to drive the usual governor 74, as well as the connector shaft 59 and its associated flange 58, the latter being in driving relationship with the ring 32, as described above.

OPERATION

In operation, it may be noted that the overall speed ratio of the rotary speed of the governor drive shaft 14 and that of the speedometer take-off shaft 26 is variable, dependent upon the distance or radius between the axis of the governor drive shaft 14 and the center of the planetary unit composed of units 32, 28, and 34, i.e., the distance designated by the letter "R" in the FIGURE. Such distance R, and hence, the resultant speed ratio of the transmission 10, as required for particular combinations of tire sizes and axle ratios, is variable between predetermined limits by removing the speedometer cable [not shown] and the plug or seal 56 from the opening 38 in the speedometer take-off shaft 26, inserting a suitable tool [not shown] through the opening 38 and into the slot 54, to rotate the rod member 36 and thus axially move the sun portion 34 thereof, thereby changing the relationship between the ring member 32 and the axis of the governor drive shaft 14.

It has been determined that substantially all current axle-ratio tire-size combinations could be compensated for if the adjustment features assure a speed ratio range of from 1.7:1 to 3.5:1 reduction, and such range is readily attainable with the inventive drive arrangement described above when the variable radius R function is combined with the 1.7:1 speed reduction available from the above-described planetary arrangement, and the drive connection is via the transmission output shaft [not shown], the governor drive gear 70, the governor gear 61, the connector shaft 59, the flange 58, the ring 32, the planets 28, the carrier 30, the speedometer take-off shaft 26, and the speedometer cable [not shown].

It should be apparent that the invention provides an improved continuously variable speedometer drive arrangement wherein conventional gears and resultant gear noise have been eliminated and wherein adjustment may be readily and accurately accomplished to compensate for various axle-ratio tire-size combinations, or for subsequent tire wear or size changes.

It should also be apparent that an opposite direction of rotation for the speedometer take-off shaft 26 and, hence, the speedometer cable [not shown] is possible, simply by positioning the ring 32 on the opposite side of the center line of the governor drive shaft 14, should this be desired for a particular automotive application.

While but one embodiment of the invention has been shown and described, other modifications thereof are possible.

I claim:

1. A continuously variable speedometer drive arrangement comprising a governor housing, governor drive means mounted in said housing, a connector shaft secured to said governor drive means and extending through a first fixed support abutment formed in said governor housing, a flange formed on the end of said connector shaft exterior said first abutment, preloaded spring means mounted between said flange and said first abutment, a speedometer take-off shaft rotatably mounted through an opening formed in said governor housing so as to have inner and outer ends extending therefrom and having the axis thereof perpendicular to the axis of said connector shaft, means formed on the outer end of said speedometer take-off shaft for driving a speedometer drive cable, a circular axial opening formed on the inner end of said speedometer take-off shaft, a rod member having one end thereof mounted in said circular axial opening and the other end thereof supported on a second fixed support abutment formed in said governor housing, a carrier formed on said speedometer take-off shaft adjacent said inner end thereof, a sun member formed on said rod member radially aligned with said carrier, a plurality of planets mounted in said carrier and preloaded intermediate said sun member and an outer ring, said outer ring being frictionally contacted by said flange under the force of said preloaded spring means a predetermined distance from the axis of said connector shaft for driving said speedometer take-off shaft at a predetermined speed ratio with respect to said connector shaft, and adjustment means operatively connected to said rod member for axially moving said rod member and, hence, said inner race, said planets and said outer race for varying said distance from the axis of said connector shaft to thereby vary the speed ratio between said connector shaft and said speedometer take-off shaft.

2. A continuously variable speedometer drive arrangement comprising a governor housing, governor drive means mounted in said housing, a connector shaft secured to said governor drive means and extending through a first fixed support abutment formed in said governor housing, a flange formed on the end of said connector shaft exterior said first abutment, resilient means secured to said first abutment, bearing means mounted between said flange and said resilient means providing a predetermined preload in said resilient means, a speedometer take-off shaft rotatably mounted through an opening formed in said governor housing so as to have inner and outer ends extending therefrom and having the axis thereof perpendicular to the axis of said connector shaft, a noncircular axial opening formed in the outer end of said speedometer take-off shaft for the insertion therein of a speedometer drive cable and a circular axial opening formed on the inner end of said speedometer take-off shaft, a rod member having one end thereof mounted in said circular axial opening and the other end thereof threadedly mounted in a threaded opening formed in a second fixed support abutment formed in said governor housing, a plurality of equally spaced radial openings formed in said speedometer take-off shaft adjacent said inner end thereof, an inner race formed in said rod member radially inwardly of said radial openings, and a plurality of planets mounted in said radial openings and preloaded intermediate said inner race and an outer race, said outer race being frictionally contacted by said flange under the force of said resilient means a predetermined distance from the axis of said connector shaft, and adjustment means associated with said rod member for threadedly moving said rod member and, hence, said inner race, said planets and said outer race for varying said distance from the axis of said connector shaft to thereby vary the resultant connector shaft to speedometer take-off shaft speed ratio.

3. A continuously variable speedometer drive arrangement comprising a governor housing, governor drive means mounted in said housing, a connector shaft secured to said governor drive means and extending through a first fixed support abutment formed in said governor housing, a flange formed on the end of said connector shaft exterior said first abutment, a Belleville spring mounted adjacent said first abutment, bearing means mounted between said flange and said Belleville spring, providing a predetermined preload in said Belleville spring, a speedometer take-off shaft rotatably mounted through an opening formed in said governor housing so as to have inner and outer ends extending therefrom and having the axis thereof perpendicular to the axis of said connector shaft, a noncircular axial opening formed in the outer end of said speedometer take-off shaft for the insertion therein of a speedometer drive cable and a circular axial opening formed on the inner end of said speedometer take-off shaft, a rod member having one end thereof mounted in said circular axial opening and the other end thereof threadedly mounted in a threaded opening formed in a second fixed support abutment formed in said governor housing, a plurality of equally spaced radial openings formed in said speedometer take-off shaft adjacent said inner end thereof, an annular groove formed in said rod member radially inwardly of said radial openings, a plurality of planets mounted in said radial openings and preloaded intermediate said annular groove and an outer race, said outer race being frictionally contacted by said flange under the force of said Belleville spring a predetermined distance from the axis of said connector shaft, and adjustment means formed in said one end of said rod member with access thereto being through said noncircular axial opening in said speedometer take-off shaft for threadedly moving said rod member and, hence, said annular groove, said planets and said outer race for varying said distance from the axis of said connector shaft to thereby vary the resultant governor drive means to speedometer take-off shaft speed ratio.

* * * * *